E. E. SHINER.
REINFORCED BELT.
APPLICATION FILED APR. 29, 1920.
1,360,456.
Patented Nov. 30, 1920.
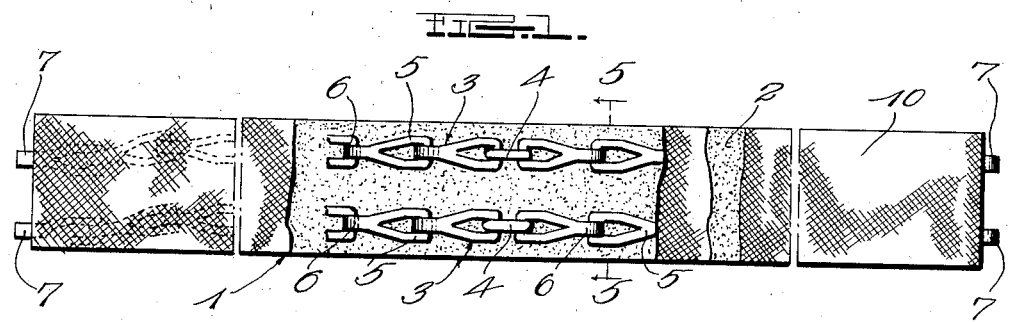
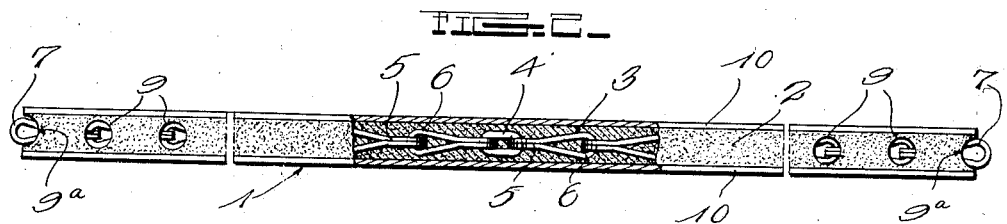
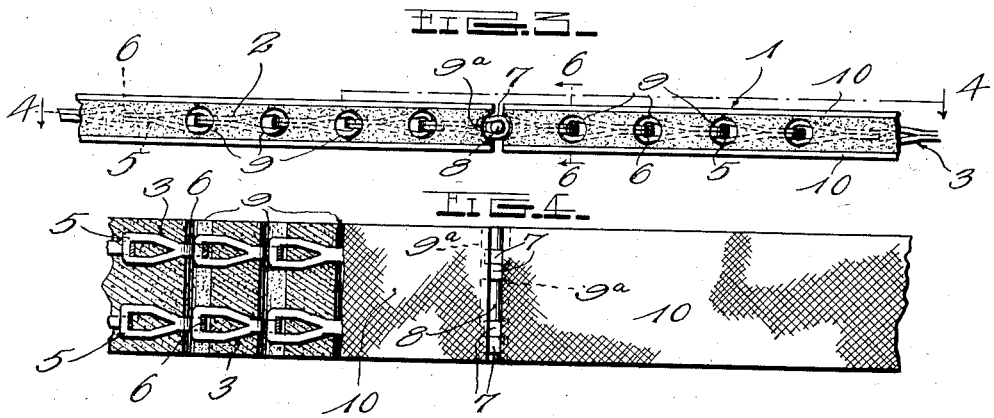
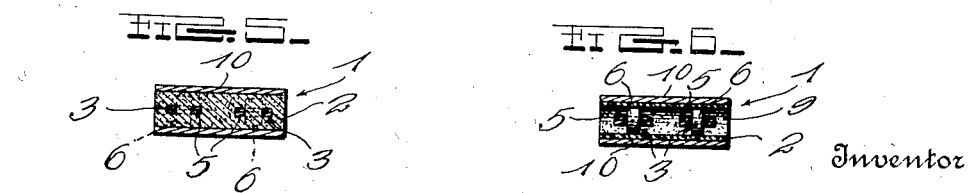
Witness:
George W. Giovannetti
Inventor
E. E. Shiner
By H. B. Willson & co.
Attorneys

UNITED STATES PATENT OFFICE.

ELLIOTT E. SHINER, OF SAN ANTONIO, TEXAS.

REINFORCED BELT.

1,360,456.

Specification of Letters Patent.   Patented Nov. 30, 1920.

Application filed April 29, 1920.   Serial No. 377,639.

*To all whom it may concern:*

Be it known that I, ELLIOTT E. SHINER, a citizen of the United States, residing at San Antonio, in the county of Bexar and State of Texas, have invented certain new and useful Improvements in Reinforced Belts; and I do declare the following to be a full, clear, and exact description of the invention, such as will enable others skilled in the art to which it appertains to make and use the same.

This invention relates to improvements in belt construction, and its has more particular reference to a reinforced belt which is designed to be used for power transmission, although it is not to be restricted to such use.

An object of the invention is to provide a belt in which the reinforcing element is in the form of a steel link chain, which is so arranged and embedded in the material from which the belt is formed, that the end links of each chain extend beyond the meeting ends of said material and form coupling eyes, through which a pin may be placed to connect the ends of the belt together.

Another object of the invention is to provide a belt reinforced in the above manner, which is provided with indicating means, that is, means which enables the belt to be cut at the proper and most advantageous place when it is found necessary to shorten it.

A further object of the invention is to generally improve upon the construction of belts of this kind; to provide one which is extremely flexible, yet strong and durable; and to produce one of extreme simplicity which is highly effective in use and yet inexpensive to manufacture.

Other objects and advantages of the invention will be apparent during the course of the following description.

In the accompanying drawings forming a part of this specification and in which like numerals are employed to designate like parts throughout the same:

Figure 1 is an elevation, partly in section, of a belt constructed in accordance with my invention.

Fig. 2 is an edge view with parts broken away to disclose the interior construction more clearly.

Fig. 3 is likewise an edge view, but it shows the manner in which the ends of the belt are connected.

Fig. 4 is a view taken on the plane of the line 4—4 of Fig. 3, looking in the direction of the arrows.

Figs. 5 and 6 are transverse sections taken on the lines 5—5 and 6—6 respectively of Figs. 1 and 4.

In the drawings, wherein for the purpose of illustration is shown a preferred embodiment of my invention, the numeral 1 indicates the belt as a whole, which is made up of a rubber body member 2 in which steel link chains 3 are embedded. It is to be noted that these chains are arranged in pairs, that is, there are two pairs of chains and each pair is extended from the meeting ends of the rubber body 1 toward the center thereof, at which point they are connected together by supplemental links 4. The type of chain which I employ is a very well known type, and I desire to use this type because it is extremely light and yet strong and durable. By examining these chains closely it will be noted that the links thereof are of substantially U formation and that the arms 5 of each link are apertured to receive the bend 6 of the adjacent link. Attention is directed to the fact that by employing chains having links of this construction, I am enabled to utilize the end link of each chain as a coupling eye 7 by means of which the ends of the belt may be connected together. To this end, it will be seen that when the chains are embedded in the rubber body, the bends 6 of the links of one pair of chains are disposed in a direction opposite to the bends of the links of the other pair of chains, the bend of the end link of each chain being permitted to extend beyond the meeting edges of the belt proper to provide the aforesaid coupling eyes 7. A pin 8 may be passed through these eyes 7 to connect the ends of the belt together. It may also be well to mention here that when embedding the chains, the last few links of one pair of chains will be directed toward one edge of the body as shown in dotted lines in Fig. 1 at the left, this being done so that the eyes will interlock and aline with one another to permit passage of the connecting pin 8 therethrough.

It will be found necessary at times to shorten the belt. To assist in carrying out this operation I provide the rubber body 2 near its ends with openings 9, which extend through it from side to side. Each opening, which is cylindrical, is disposed directly opposite the connecting points of the links, or it may be said that it alines with the bend 6 of the links. For convenience of description I will term these openings "indicating means" which seems to be a fairly applicable term for the same, in view of the fact that they indicate the proper point at which the belt should be cut when shortening the same. This feature of construction is advantageous in that it will save material, which would, in all probability, otherwise be wasted. Then again, by making the holes of cylindrical formation, clearance spaces will be provided. To explain, it is to be said that when the user desires to shorten the belt, he will cut it at the point designated by the opening, after which, the surplus link or links may be disconnected. After the belt is severed in this way, the opposite ends of the material 2 will be left with semi-cylindrical concavities 9a, which will provide a cylindrical clearance space for the pin 8 when brought together. Otherwise, the rubber would fill the newly made coupling eyes and would have to be removed, which operation would consume additional time and expense. On the other hand, the job would not be as neat and could not be as easily accomplished as my construction insures and permits.

Secured on opposite sides of the rubber strip or body 2 by cement or the like, are strips 10 of fabric material which provide proper traction surfaces for the belt and also increase its strength and length of life.

From the foregoing description it will be seen that I have perfected a belt of extreme simplicity which is advantageous in a great many ways to reinforce belts now in use. The aforesaid assertion is true in one respect because of the new way I provide coupling eyes for the belt. On the other hand, it is true because the means which I provide for enabling the belt to be shortened is new and may be easily accomplished. The belt in itself is extremely light and flexible and yet is very strong and durable.

I desire it to be understood that the "indicating means" already referred to and described may be of some other construction. For instance, marks or suitable designs would accomplish the primary purpose of this means, but of course would not provide the clearance spaces desired. Also, I do not desire to limit myself to the exact type of chain shown.

It is also to be understood that the form of my invention herein shown and described is to be taken as a preferred form of the same, and that various minor changes in the shape, size, and arrangement of parts may be resorted to without departing from the spirit of the invention or the scope of the subjoined claims.

I claim:

1. A belt of the character set forth comprising a body of flexible material, chains embedded in said material, each chain extending from the meeting ends of the material toward the center, a supplemental link connecting the inner ends of the chains, each chain being made up of substantially U-shaped links, the arms of which are provided with openings to receive the bent end of the adjacent link, the bent ends of the links of one chain being disposed toward one end of the body while the bent ends of the links of the other chains are disposed toward the other end of the body, so that the bent ends of the two end links of each chain will project beyond the ends of the material to form coupling eyes.

2. A belt of the class described composed of a body of flexible material in which chains are embedded, and indicating means on the material directly opposite the connecting points of the chain links to enable the belt to be properly cut when shortening it.

3. A belt of the class described comprising a body of flexible material, chains embedded in said material, said chains being made up of links of U-formation, and indicating means, said means being in the form of cylindrical holes which extend through the material from side to side, each hole being in alinement with the bends of the links so as to provide clearance spaces for a coupling pin.

In testimony whereof I have hereunto set my hand.

ELLIOTT E. SHINER.